United States Patent
Chiang (10) Patent No.: US 8,813,163 B2
(45) Date of Patent: Aug. 19, 2014

(54) METHODS, COMMUNICATION DEVICE, AND COMMUNICATION SYSTEM FOR PRESENTING MULTI-MEDIA CONTENT IN CONJUNCTION WITH USER IDENTIFICATIONS CORRESPONDING TO THE SAME CHANNEL NUMBER

(75) Inventor: Yueh-Hsuan Chiang, Taipei (TW)

(73) Assignee: CyberLink Corp., Xindian Dist., New Taipei (TW)

( * ) Notice: Subject to any disclaimer, the term of this patent is extended or adjusted under 35 U.S.C. 154(b) by 986 days.

(21) Appl. No.: 11/420,477

(22) Filed: May 26, 2006

(65) Prior Publication Data

US 2007/0277217 A1 Nov. 29, 2007

(51) Int. Cl.
*H04N 7/16* (2011.01)
*H04N 21/482* (2011.01)
*H04N 21/443* (2011.01)
*H04N 21/475* (2011.01)
*H04N 21/4788* (2011.01)

(52) U.S. Cl.
CPC ........... *H04N 7/165* (2013.01); *H04N 21/4826* (2013.01); *H04N 21/4438* (2013.01); *H04N 21/4751* (2013.01); *H04N 21/4788* (2013.01)
USPC ........... 725/135; 725/136; 725/137; 725/138; 725/139

(58) Field of Classification Search
USPC ................................. 725/135–139
See application file for complete search history.

(56) References Cited

U.S. PATENT DOCUMENTS

| | | |
|---|---|---|
| 6,388,714 B1 | 5/2002 | Schein et al. |
| 6,661,340 B1 | 12/2003 | Saylor et al. |
| 6,965,313 B1 | 11/2005 | Saylor et al. |
| 2002/0023230 A1 | 2/2002 | Bolnick et al. |
| 2002/0032904 A1 | 3/2002 | Lerner |
| 2002/0053075 A1 | 5/2002 | Paz et al. |
| 2002/0083458 A1 | 6/2002 | Henderson et al. |
| 2002/0138840 A1 | 9/2002 | Schein et al. |
| 2002/0143241 A1 | 10/2002 | Thorell |
| 2002/0147645 A1 | 10/2002 | Alao et al. |
| 2002/0147701 A1 | 10/2002 | Chang |
| 2003/0041332 A1 | 2/2003 | Allen et al. |
| 2003/0196201 A1 | 10/2003 | Schein et al. |
| 2003/0208758 A1 | 11/2003 | Schein et al. |
| 2003/0208777 A1 | 11/2003 | Danker et al. |
| 2003/0212708 A1 | 11/2003 | Potrebic et al. |
| 2003/0229900 A1 | 12/2003 | Reisman |
| 2004/0010808 A1 | 1/2004 | deCarmo |
| 2004/0031058 A1 | 2/2004 | Reisman |
| 2004/0216156 A1 | 10/2004 | Wagner |
| 2004/0231003 A1* | 11/2004 | Cooper et al. ................ 725/135 |
| 2004/0244056 A1 | 12/2004 | Lorenz et al. |

(Continued)

FOREIGN PATENT DOCUMENTS

| | | | |
|---|---|---|---|
| JP | H05219503 A | 8/1993 | |
| JP | H10191241 A | 7/1998 | |

(Continued)

*Primary Examiner* — Mulugeta Mengesha
(74) *Attorney, Agent, or Firm* — Winston Hsu; Scott Margo (57) ABSTRACT

A method for presenting multi-media contents on a specific communication device is disclosed. The method includes detecting a multi-media content channel currently tuned by the specific communication device; and in addition to a specific multi-media content corresponding to a specific channel number currently tuned by the specific communication device, presenting an information communication user interface.

18 Claims, 5 Drawing Sheets

(56) References Cited

U.S. PATENT DOCUMENTS

| | | |
|---|---|---|
| 2005/0027539 A1 | 2/2005 | Weber et al. |
| 2005/0039214 A1 | 2/2005 | Lorenz et al. |
| 2005/0066365 A1 | 3/2005 | Rambo |
| 2005/0086211 A1 | 4/2005 | Mayer |
| 2005/0091695 A1 | 4/2005 | Paz et al. |
| 2005/0159863 A1 | 7/2005 | Howard et al. |
| 2005/0197164 A1 | 9/2005 | Chan |
| 2005/0273830 A1 | 12/2005 | Silver et al. |
| 2007/0124795 A1* | 5/2007 | McKissick et al. ........... 725/135 |
| 2007/0198738 A1* | 8/2007 | Angiolillo et al. ............ 709/231 |

FOREIGN PATENT DOCUMENTS

| | | | |
|---|---|---|---|
| JP | 200041185 A | | 2/2000 |
| JP | 2001520426 | | 10/2001 |
| JP | 2002524935 | | 8/2002 |
| JP | 2003157288 | | 5/2003 |
| WO | 9920026 | | 4/1999 |
| WO | 0013416 | | 3/2000 |
| WO | WO 2005013617 | * | 2/2005 |

* cited by examiner

METHODS, COMMUNICATION DEVICE, AND COMMUNICATION SYSTEM FOR PRESENTING MULTI-MEDIA CONTENT IN CONJUNCTION WITH USER IDENTIFICATIONS CORRESPONDING TO THE SAME CHANNEL NUMBER

BACKGROUND OF THE INVENTION

1. Field of the Invention

The present invention relates generally to a system for presenting multi-media content and a related method, and more particularly, to an interactive multi-media environment having dynamic communications and the related method.

2. Description of the Prior Art

In the prior art, multi-media content can be displayed on television sets, monitors, and other such devices. Additionally, interactive and dynamic communications can be displayed whereby people can communicate via typing words or speaking. The communications is often called a chat or discussion room. In the prior art, it is common for a person to maintain a list of known people that also use the same dynamic communications chat system. This list is often called a friends or a buddy list.

Unfortunately, it is not currently possible for a user to combine the functionality of the two systems. Therefore, the following drawbacks exist today.

First, when watching the multi-media content people do not know who else is watching the same multi-media content. Second, people cannot determine what specific available content is the most popular. For example, most popular can be defined as the multi-media content that is currently being watched by the most number of people contained in the buddy list. Obviously many other definitions are possible. Third, a person watching a specific content might have friends watching the same content but because the multi-media content display is static in the prior art and not combined with the dynamic communications of the chat systems these friends are not able to communicate to one another regarding the content that they are both watching.

As a result, people have a very static multi-media viewing experience and this experience is disjoint from that environment people have a parallel environment that is very dynamic and interactive where they are able to communicate via text, voice, and video image with other people. The two environments are not linked to each other; they operate in isolation from each other.

Therefore, it is apparent that new and improved methods and devices are needed.

SUMMARY OF THE INVENTION

It is therefore one of the objectives of the claimed invention to provide a method for presenting multi-media contents on a specific communication device and the related apparatus thereof to solve the above mentioned problems.

According to an embodiment of the claimed invention a method for presenting multi-media contents on a specific communication device is disclosed. The method includes the steps of: detecting a multi-media content channel currently tuned by the specific communication device; and in addition to a specific multi-media content corresponding to a specific channel number currently tuned by the specific communication device, presenting an information communication user interface.

According to an embodiment of the claimed invention a communication device for presenting multi-media contents on a display device is disclosed. The communication device includes a video processor, for receiving a specific multi-media content and processing the specific multi-media content to drive the display device; a microprocessor, coupled to the video processor; and a storage device, coupled to the microprocessor, for storing a program execution code, the program execution code executed by the microprocessor being for: detecting a multi-media content channel currently tuned by the specific communication device; and in addition to the specific multi-media content corresponding to a specific channel number currently tuned by the specific communication device, controlling the video processor to drive the display device to present an information communication user interface.

The static multi-media viewing experience is vastly improved by the present invention by facilitating communication between the plurality of communication devices that are tuned (i.e., watching) the same channel number.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims to refer to particular system components. As one skilled in the art will appreciate, consumer electronic equipment manufacturers may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . " The terms "couple" and "couples" are intended to mean either an indirect or a direct electrical connection. Thus, if a first device couples to a second device, that connection may be through a direct electrical connection, or through an indirect electrical connection via other devices and connections.

Figure 1:
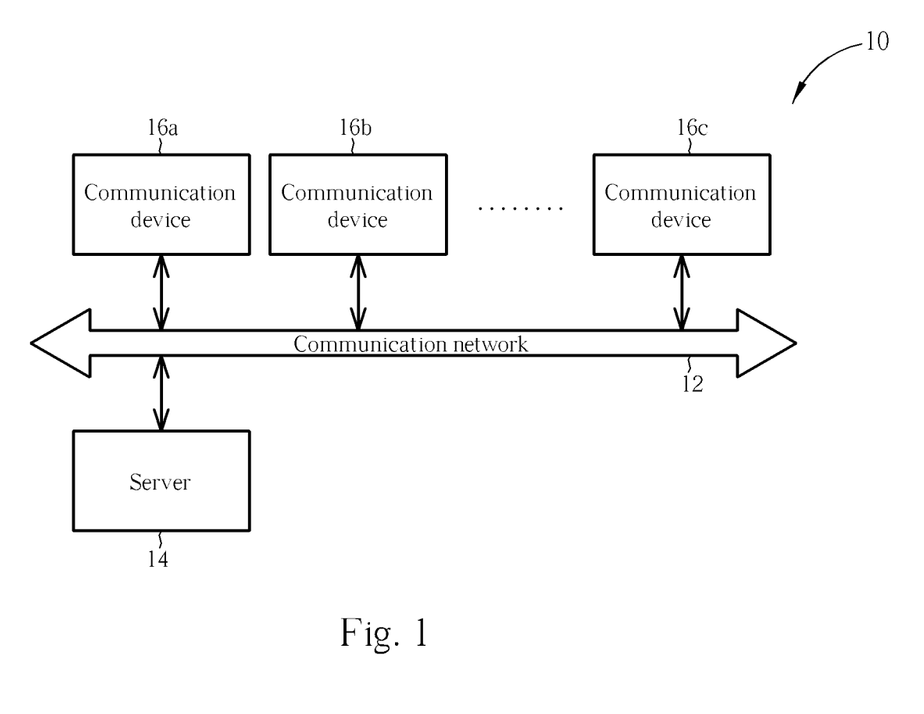
FIG. 1 illustrates a diagram of a communication system according to an embodiment of the present invention.

Please refer to FIG. 1. FIG. 1 illustrates a diagram of a communication system 10 according to an embodiment of the present invention. The communication system 10 includes a communication network 12, a server 14, and a plurality of communication devices 16a-16c. Please note that only three communication devices 16a-16c are shown for simplicity. That is, the communication system 10 of the present invention does not limit the number of communication devices 16a-16c that are connected to the communication network 12. In this embodiment, the communication network 12 could be implemented by a television provider network (e.g., a cable TV network), or the Internet, or a computer communications network, or any combination. In other words, the communication devices 16a-16c and the server 14 can be connected together by a cable network system or any other network, wired or wireless, that facilitates connectivity. The communication network 12 acts as an interface between the server 14 and each communication device 16a, 16b, 16c to allow the communication devices 16a-16c to write data to or read data from the server 14.

Figure 2:
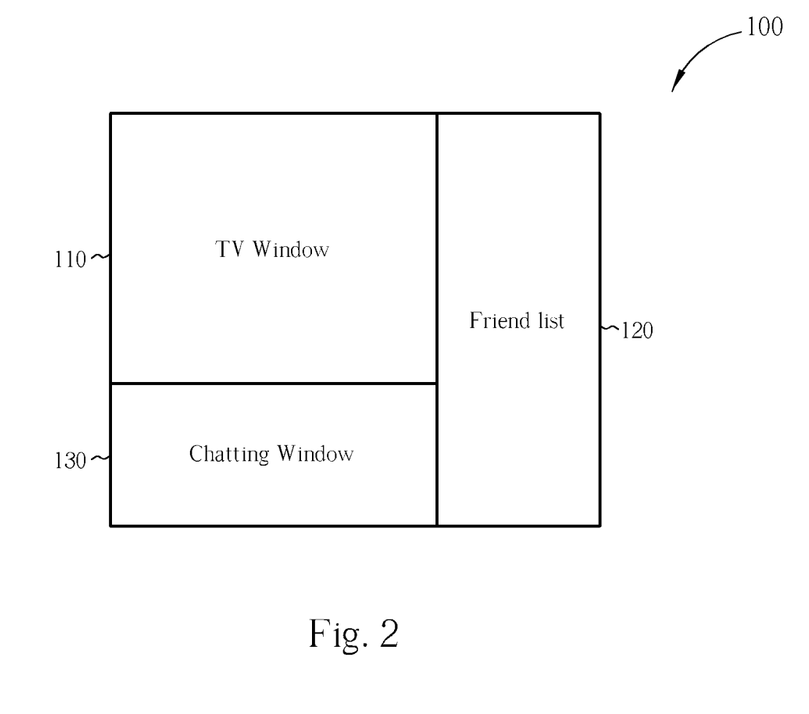
FIG. 2 illustrates a diagram of a user interface shown on each communication device of FIG. 1 according to a preferred embodiment of the present invention.

Please refer to FIG. 2. FIG. 2 illustrates a diagram of a user interface 100 shown on each communication device according to an embodiment of the present invention. The user interface 100 includes a main display area for the multi-media content and this is labeled TV window 110. Note that the user interface 100 can be displayed on a screen, for example, the display screen can be in the form of a television set, a display screen of a high-definition digital television set, and other such similar display apparatuses. The TV window 110 displays the current TV program that the user is watching (i.e., that the user has selected/tuned). Additional areas of user interface 100 are described below, however, these are optional because the users of the communication system 10 may desire to utilize a full-screen mode. In the case of a full-screen mode the user interface 100 displays only the TV window 110 and the TV window 110 expands to cover the entire active display area and the other elements (described below) are temporarily hidden.

Also, in FIG. 2, a friend list 120 is shown to the right of the TV window 110. The friend list 120 can be defined by the user of the communication device 16a, 16b, or 16c. Many options are available for implementing the friend list 120, for example, all the defined friends can be displayed in the friend list 120 or only the friends that are currently watching the same multi-media content as is being presented in the TV window 110 or all people who are watching said multi-media content regardless of being defined as friends can be displayed. It is within the scope of the present invention that the friend list 120 can indicate in various means, for example, color or animation, the friends who are also watching said same multi-media content or friends who are online or offline (i.e., watching the same presented multi-media content or not watching the same presented multi-media content). The implementation options for the friend list 120 are well-known and numerous and therefore additional details are not required here. In the preferred embodiment of the present invention, the friend list 120 shows the other users that are watching the same channel that is currently displayed in the TV window 110, for example, perhaps other users that are utilizing the communication devices, coupled to the communication network 12, in a number of other locations. In another embodiment, the friend list 120 can be configured to show the communication devices that are coupled to the communications network 12 but do not correspond to the specific channel number currently tuned by the specific communication device. Obviously many variations and options are available for deciding the criteria for displaying the friends list 120 and these are all within the scope of the present invention.

Also, in FIG. 2, a chatting window 130 is shown below the TV window 110. When watching the TV window 110 the user can interact with other people watching the same TV program (i.e., multi-media content) that is being presented in the TV window 110. This allows a person to chat, discuss, and make friends with others who have the same TV watching preferences. The experience of enjoying a specific multi-media content as presented in the TV window 110 is greatly enhanced by the chatting window 130 because the otherwise static presentation of the multi-media content is coupled with an interactive and dynamic interface where viewers can chat about the multi-media content as it is presented in the TV window 110. The implementation options for the chatting window 130 are well-known and numerous and therefore additional details are not required here. Please note that in another embodiment, the friend list 120 and the chatting window 130 can be considered to be combined to function as a communication user interface. This term is applied here and used for simplicity to distinguish the multi-media portion of the user interface 100, that being the TV window 110, from the other portion of the user interface 100, that being the communication user interface which is the combination of the friend list 120 window and the chatting window 130.

Figure 3:
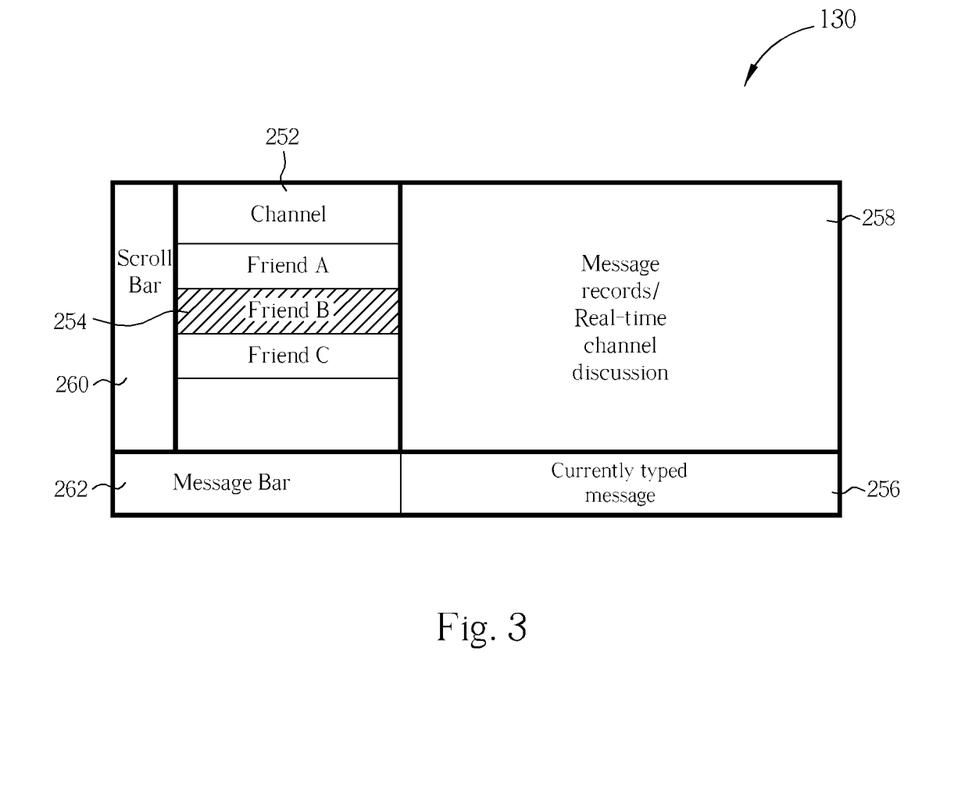
FIG. 3 shows a detailed layout of a chatting window shown in FIG. 2.

Please refer to FIG. 3. FIG. 3 shows a detailed layout of the chatting window 130 shown in FIG. 2. FIG. 3 is an example only and the present invention is not limited by the example chatting window user interface shown in FIG. 3. The channel area 252 shows the currently available users/channels (i.e., forums). Any user shown in the channel area 252 can be selected thereby facilitating chatting/communications. Additionally, forums can be displayed in the channel area 252 and the forums can be selected as well to both see the forum content and to facilitate communication with the forum. As shown in FIG. 3, Friend B is currently selected as indicated by the selection area 254. For example, in FIG. 3, the user of the present invention is currently talking/communicating with Friend B via the chatting window 130, therefore the currently typed message 256 is the message that the user wants to send to Friend B. Please note, the chatting window 130 can also be used to display news or promotion information. In other words, the chatting window 130 is not limited to interaction between users. The user can simply view the chatting window 130 and see advertisements, news, and any sort of other information text-based or otherwise.

Additionally, a message records/real-time channel discussion 258 area shows the message records between the user and Friend B. A scroll bar 260 is provided to facilitate scrolling and access to the channel 252 area for when more friends and/or forums are available than can be displayed at the same time. A message bar 262 is shown as a title block simply to identify the currently typed message 256 area to its right.

Figure 4:
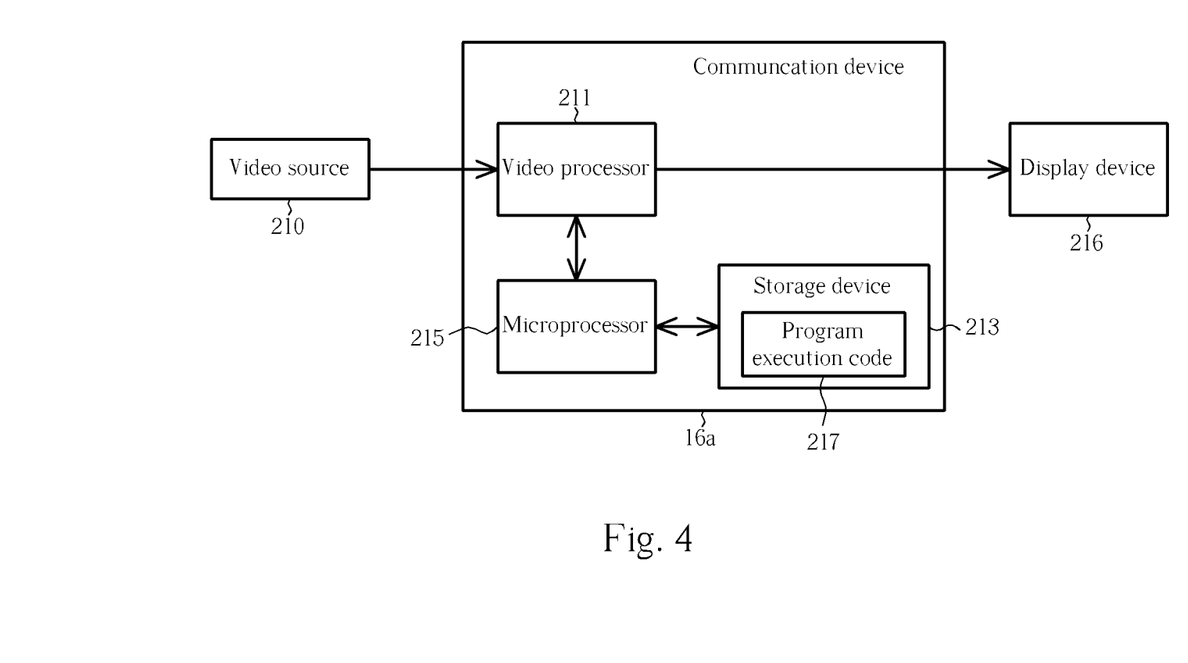
FIG. 4 is a simplified block diagram of the communication device shown in FIG. 1.

Please refer to FIG. 4. FIG. 4 is simplified block diagram of the communication device 16a shown in FIG. 1. In this embodiment, since the communication devices 16a-16c have the same circuit configuration, only the communication device 16a is illustrated for simplicity. However, the present invention is not limited to use identical communication devices. Any devices that support the functions and operations detailed as below can be utilized to serve as the desired communication devices. As shown in FIG. 4, the communication device 16a is coupled to a video source 210 wirelessly or via a cable or by any means, where the video source 210 provides the communication system 10 with the desired video signal (i.e., the source signal). For example, the video source 210 can be a digital television signal provided by a digital television service provider. In the communication device 16a, a video processor (e.g., a video decoder) 211, coupled to the video source 210, receives the video signal from the video source 210 and processes/decodes the received video signal to generate a video data corresponding to a tuned/selected channel (e.g., a TV program channel) and then drives the display device 216 according to the video data to display the user interface 100 shown in FIG. 2, where the multi-media content of the channel tuned by the user is presented in the TV window 110. The functionality and operation of the video processor 211 is well known to those of average skill in the art and therefore further explanation is omitted for brevity here.

A microprocessor 215 is coupled to the video processor 211 for executing a program execution code 217 stored in a storage device (e.g., a Flash memory) 213. The program execution code 217 executed by the microprocessor 215 controls the video processor 211 to show the user interface 100 in FIG. 2. The operation of the program execution code 217 is detailed in FIG. 5 later.

The video processor 211 scales the video data corresponding to the video signal provided by the video source 210 to display the multi-media content in the TV window 110. In addition, in response to the commands and data given by the microprocessor 215 executing the program execution code 217, the video processor 211 display chatting information in the chatting window 130 and friend information in the friend list 120. The display device 216 can be, for example, a display screen of television set, a display screen of a high-definition digital television set, and other such similar display apparatuses. Please note that the communication devices 16a can be implemented in a TV set (e.g., digital TV) or a set-top box connected to a TV set as well as an independent device disjoint from said TV set or said set-top box. For example, the communication devices 16a-16c shown in FIG. 1 include personal computers, or set-top boxes, or TV sets, or any combination. These alternative designs fall in the scope of the present invention.

Finally, the user of the communication device 16a can control the communication device 16a via a remote control device (not shown) or any number of other means such as touch pad controls (not shown), on screen controls (not shown), or voice commands via a voice recognition system (not shown). Any method allowing the user to communicate their commands to the communication device 16a obeys the spirit of the present invention.

Figure 5:
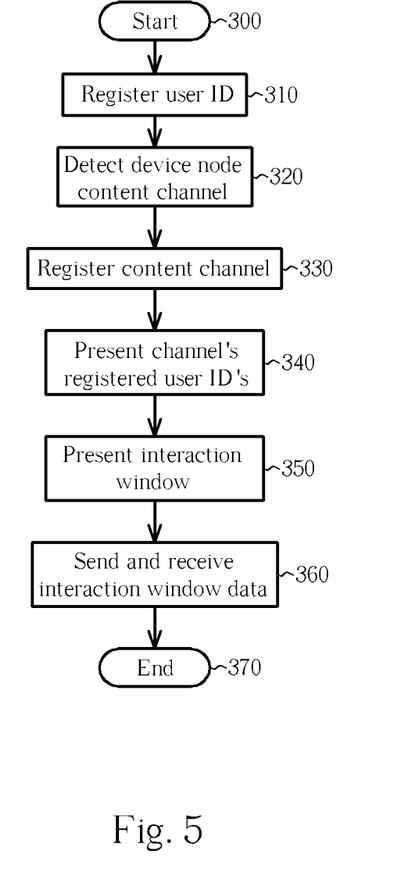
FIG. 5 is a flow chart showing one embodiment for multi-media presentation and communications according to the present invention.

Please refer to FIG. 5. FIG. 5 is a flow chart showing a method for multi-media presentation and communications according to the present invention. The method of the present invention shown in FIG. 5 is performed using each communication device 16a, 16b, 16c, and comprises the following steps:

Step 300: Start.
Step 310: Register a user ID.
Step 320: Detect device node content channel.
Step 330: Register content channel.
Step 340: Present channel's registered user IDs.
Step 350: Present interaction window.
Step 360: Send and receive interaction window data.
Step 370: Stop.

Taking the communication device 16a shown in FIG. 4 for example, in step 310, the microprocessor 215 executes the program execution code 217 to register a user identification at the server 14 via the communication network 12. Please note, step 310 is optional and is not required by the present invention. Communication devices 16a-16c or any other similar such devices that join the communication network 12 can easily be referenced for use by the present invention using well-known network protocols and techniques. In the case of the communication system 10 having a plurality of communication devices 16a-16c, where a plurality of user IDs for these communication devices 16a-16c exist then each user ID is registered. In step 320, a multi-media content channel that is currently tuned by the communication device 16a is detected by the microprocessor 215 executing the program execution code 217. Please note that each of the communication devices 16a-16c receives a plurality of multi-media content channels from the video source 210 before detecting the multi-media content channel currently tuned. In step 330, the microprocessor 215 executes the program execution code 217 to register a currently tuned channel number at the server 14 via the communication network 12. In other words, the user of the communication device 16a will, perhaps via a remote control, select one multi-media content channel and that specific channel is then registered at the server 14. In step 340, in addition to displaying the specific multi-media content corresponding to the specific channel number currently tuned by the communication device 16a on the display device 216, the microprocessor 215 executes the program execution code 217 to control the video processor 211 to drive the display device 216 to display user identifications of other users that are watching the same multi-media content channel. This is achieved, for example, by referencing the registered user identifications and corresponding currently tuned channel numbers of other communication devices that have also registered user IDs according to the flow of FIG. 4. Please note, step 340 is optional and is not required by the present invention. Unregistered communication devices 16a-16c can simply be shown as "unregistered" or "anonymous" or any other such denotation as is presently required. In step 350, a chatting window 130 is displayed. The chatting window 130 further displays the specific communication (i.e., chats) corresponding to other communication devices that are watching the same multi-media content channel. In step 360, the chatting window 130 is used for sending user input to or receiving user input from communication devices having user identifications corresponding to the same specific channel number. In other words, the user of the communication device 16a can use, for example, a keyboard or other similar input device to enter chatting data into the chatting window 130 and thereafter that chatting data is displayed in the chatting window 130 of all other communication devices (e.g., the communication devices 16b and 16c) that are watching the same multi-media content channel.

The communication device 16a can exist in a communication system 10 with a plurality of other communication devices 16b, 16c wherein each communication device 16a, 16b, 16c can represent a friend in the friend list 120. The flow of FIG. 5 can be expanded to include a scope of many, or at least more than one, communication device. In this case, each of the communication devices executes the flow as shown in FIG. 5.

In another embodiment of the present invention, any one of the windows shown in the figures, for example, the TV window 110 or the chatting window 130, can include a sub-window for showing an additional multi-media content such as an advertisement. Moreover, in another embodiment, it is within the spirit of the present invention that an additional window (not shown) can be easily added, layered, or otherwise integrated into the environments shown in FIG. 2 or FIG. 3 easily by one of average skill in the art and said additional window can be used for displaying said additional multi-media content.

In another embodiment, all of the users (i.e., communication devices) that join the communication network 12 are displayed in the friend list 120 and in the event that said user's communication devices are not registered (i.e., registration is not required) then said unregistered communication devices can appear in the friend list 120 as "guest" or "anonymous" or any other notation as is required by the present application of the present invention.

In summary, the static multi-media viewing experience is vastly improved by the present invention by facilitating communication between the plurality of communication devices that are tuned (i.e., watching) the same channel number.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for presenting multi-media contents on a specific communication device, comprising the steps of:
   registering at least one of a plurality of user identifications at a server via a communication network;
   utilizing the specific communication device to access the communication network;
   detecting multi-media content channels currently tuned by registered communication devices on the communication network; and
   in addition to a specific multi-media content corresponding to a specific channel number currently tuned by the specific communication device, presenting an information communication user interface that displays user identifications and the corresponding tuned channel numbers, wherein a microprocessor executes a program execution code to control a video processor to display the registered user identifications of other users that are watching the same multi-media content channel.

2. The method of claim 1 further comprising:
   before detecting the multi-media content channel currently tuned by the specific communication device, receiving a plurality of multi-media content channels.

3. The method of claim 1, wherein the tuned channel numbers correspond to the same specific channel number currently tuned by the specific communication device.

4. The method of claim 1, wherein the step of presenting the information communication user interface comprises:
   sending user input to or receiving user input from communication devices through the information communication user interface.

5. The method of claim 4, wherein the communication devices correspond to the same specific channel number currently tuned by the specific communication device.

6. The method of claim 4, wherein the communication devices do not correspond to the specific channel number currently tuned by the specific communication device.

7. The method of claim 1, wherein each multi-media content channel is a TV program channel.

8. A communication device for presenting multi-media contents on a display device, the communication device comprising:
   a video processor, for receiving a specific multi-media content and processing the specific multi-media content to drive the display device;
   a microprocessor, coupled to the video processor; and
   a storage device, coupled to the microprocessor, for storing a program execution code, the program execution code executed by the microprocessor being for:
   registering at least one of a plurality of user identifications at a server via a communication network;
   accessing the communication network;
   detecting a multi-media content channel currently tuned by the specific communication device and detecting multi-media content currently tuned by registered communication devices on the communication network; and
   in addition to the specific multi-media content corresponding to a specific channel number currently tuned by the specific communication device, controlling the video processor to drive the display device to present an information communication user interface that displays user identifications, and displays the corresponding tuned channel numbers, wherein a microprocessor executes a program execution code to control a video processor to display the registered user identifications of other users that are watching the same multi-media content channel.

9. The communication device of claim 8, wherein the communication device receives a plurality of multi-media content channels before detecting the multi-media content channel currently tuned by the specific communication device.

10. The communication device of claim 8, wherein the communication devices correspond to the same specific channel number currently tuned by the specific communication device.

11. The communication device of claim 8, wherein the microprocessor further executes the program execution code to control the video processor to drive the display device to send user input to or receive user input from communication devices through the information communication user interface.

12. The communication device of claim 11, wherein the communication devices correspond to the same specific channel number currently tuned by the specific communication device.

13. The communication device of claim 11, wherein the communication devices do not correspond to the specific channel number currently tuned by the specific communication device.

14. The communication device of claim 8, wherein each multi-media content channel is a TV program channel.

15. The communication device of claim 8, wherein the microprocessor further executes the program execution code to control the video processor to drive the display device to received information that is not user input.

16. A method for presenting multi-media contents on a specific communication device, comprising the steps of:
   registering at least one of a plurality of user identifications at a server via a communication network;
   utilizing the specific communication device to access the communication network;
   detecting multi-media content channels currently tuned by registered communication devices on the communication network; and
   in addition to a specific multi-media content corresponding to a specific channel number currently tuned by the specific communication device, presenting an information communication user interface that displays user identifications and the corresponding tuned channel numbers, wherein a microprocessor executes a program execution code to control a video processor to display the registered user identifications of other users that are watching the same multi-media content channel, and the corresponding tuned channel numbers are different from the specific channel number.

17. A communication device for presenting multi-media contents on a display device, the communication device comprising:
   a video processor, for receiving a specific multi-media content and processing the specific multi-media content to drive the display device;
   a microprocessor, coupled to the video processor; and
   a storage device, coupled to the microprocessor, for storing a program execution code, the program execution code executed by the microprocessor being for:
   registering at least one of a plurality of user identifications at a server via a communication network;
   accessing the communication network;
   detecting a multi-media content channel currently tuned by the specific communication device and detecting multi-media content currently tuned by registered communication devices on the communication network; and in addition to the specific multi-media content corresponding to a specific channel number currently tuned by the specific communication device, controlling the video processor to drive the display device to present an information communication user interface that displays user identifications and displays the corresponding tuned channel numbers, wherein a microprocessor executes a program execution code to control a video processor to display the registered user identifications of other users that are watching the same multi-media content channel, and the corresponding tuned channel numbers are different from the specific channel number.

18. The method of claim 1, wherein the forums can be selected in order to view the forum content and to facilitate communication between the user and the forums.

* * * * *